United States Patent [19]
Shigematsu et al.

[11] Patent Number: 6,097,745
[45] Date of Patent: Aug. 1, 2000

[54] LASER OSCILLATOR SYSTEM

[75] Inventors: Noriaki Shigematsu, Sayama; Kazuhide Matsuo, Kawagoe; Isao Bundo, Iruma, all of Japan

[73] Assignee: Honda Giken Kogyo Kabushiki Kaisha, Tokyo, Japan

[21] Appl. No.: 09/110,854

[22] Filed: Jul. 7, 1998

[30] Foreign Application Priority Data

Jul. 7, 1997 [JP] Japan ..................................... 9-180971

[51] Int. Cl.⁷ .................................................. H01S 3/04
[52] U.S. Cl. ............................................................. 372/35
[58] Field of Search ................................... 219/219, 220, 219/121.84, 121.86; 372/34, 35, 92

[56] References Cited

U.S. PATENT DOCUMENTS

| | | | |
|---|---|---|---|
| Re. 31,279 | 6/1983 | Mefferd et al. | 372/107 |
| 3,383,491 | 5/1968 | Muncheryan | 219/121 |
| 3,487,328 | 12/1969 | Katz | 331/94.5 |
| 3,553,604 | 1/1971 | Andress et al. | 331/4.5 |
| 4,993,041 | 2/1991 | Sidler et al. . | |
| 5,331,652 | 7/1994 | Rapoport et al. . | |
| 5,557,628 | 9/1996 | Kuba et al. . | |

FOREIGN PATENT DOCUMENTS

| | | | |
|---|---|---|---|
| 60631 | 9/1982 | European Pat. Off. . | |
| 62-133785 | 6/1987 | Japan | 372/35 |

*Primary Examiner*—Frank G. Font
*Assistant Examiner*—Gioacchino Inzirillo
*Attorney, Agent, or Firm*—Birch, Stewart, Kolasch & Birch, LLP

[57] ABSTRACT

The heat generated by a laser oscillator is partly radiated toward a frame. The radiated heat is partly absorbed by a cooling mechanism. The remaining heat is transferred through a chamber which dissipates part of the heat, to a heat insulating panel, which blocks most of the heat. The heat generated by the laser oscillator is partly radiated outwardly and reflected by a casing inwardly toward the frame. The reflected heat is partly absorbed by cooling mechanisms. The remaining heat is transferred through chambers which dissipate part of the heat, to the heat insulating panel, which blocks most of the heat. Therefore, any temperature rise of the frame due to the heat generated by the laser oscillator is very small, and the frame is prevented from being deformed due to the heat from the laser oscillator. Because the frame is not deformed, a laser beam emitted from the laser oscillator is applied to a desired position which remains unchanged.

7 Claims, 3 Drawing Sheets

LASER OSCILLATOR SYSTEM

BACKGROUND OF THE INVENTION

1. Field of the Invention

The present invention relates to a laser oscillator system for use in machining workpieces, and more particularly to a laser oscillator system having a laser oscillator and a frame supporting the laser oscillator, the frame being prevented from being deformed due to the heat of the laser oscillator.

2. Description of the Related Art

FIG. 3 of the accompanying drawings illustrates a conventional high-power laser oscillator system 10 for machining workpieces. As shown in FIG. 3, the laser oscillator system 10 has a casing 12 and an elongate frame 14 mounted in the casing 12 and extending in a direction normal to the sheet of FIG. 3. The frame 14 is of a hollow structure having a substantially square cross section, and has a plurality tubes 16a, 16b, 16c, 16d disposed in respective corners thereof for passing a coolant therethrough. A laser oscillator 20 is fixedly mounted on the frame 14 by a plurality of support legs 18. A mirror box 22 is disposed above the laser oscillator 20 for applying a laser beam emitted from the laser oscillator 20 and reflected by a mirror (not shown) upwardly of the laser oscillator 20 to a predetermined position.

While the laser oscillator system 10 is in operation, heat is transferred from the laser oscillator 20 to the frame 14 via the support legs 18 or through radiation, and the temperature of the frame 14 rises to the point where the frame 14 may be distorted due to thermal expansion thereof. When the frame 14 is thus distorted, the laser beam emitted from the laser oscillator 20 supported on the frame 14 changes its path, and the laser beam emitted from the laser oscillator system 10 will not be applied to the predetermined position. As a result, the quality of a workpiece which is being machined, e.g., welded, cut, etc., by the laser beam tends to be undesirably lowered.

SUMMARY OF THE INVENTION

It is a general object of the present invention to provide a laser oscillator system having a laser oscillator and a frame supporting the laser oscillator, the frame being prevented from being deformed due to the heat of the laser oscillator, so that a laser beam emitted from the laser oscillator will be applied constantly to a desired position for thereby machining a workpiece with a desired quality.

A major object of the present invention is to provide a laser oscillator system having a laser oscillator, a frame supporting the laser oscillator, a cooling mechanism and a heat insulating member which are disposed in a gap between the frame and the laser oscillator, for absorbing and blocking, respectively, the heat generated by the laser oscillator and radiated to the frame for thereby preventing the temperature of the frame from increasing.

Another object of the present invention is to provide a laser oscillator system having a laser oscillator and a frame supporting the laser oscillator with resin support legs for thereby preventing the temperature of the frame from increasing.

Still another object of the present invention is to provide a laser oscillator system having a laser oscillator, a frame supporting the laser oscillator, a casing which houses the laser oscillator and the frame, cooling mechanisms and a heat insulating member which are disposed around the frame, for absorbing and blocking, respectively, the heat generated by the laser oscillator and reflected by the casing.

The above and other objects, features, and advantages of the present invention will become more apparent from the following description when taken in conjunction with the accompanying drawings in which a preferred embodiment of the present invention is shown by way of example.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 1:
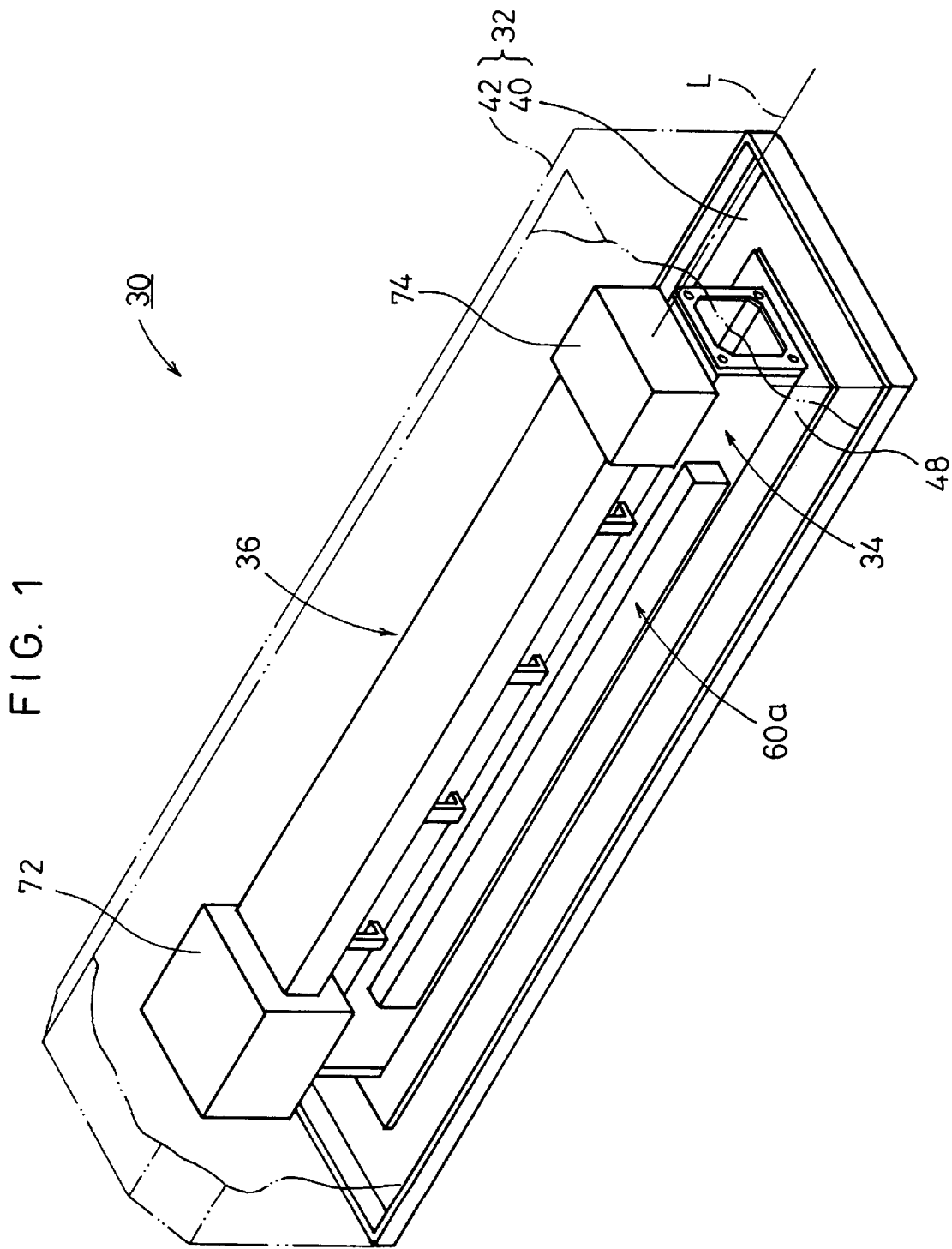
FIG. 1 is a schematic perspective view of a laser oscillator system according to the present invention.
Figure 2:
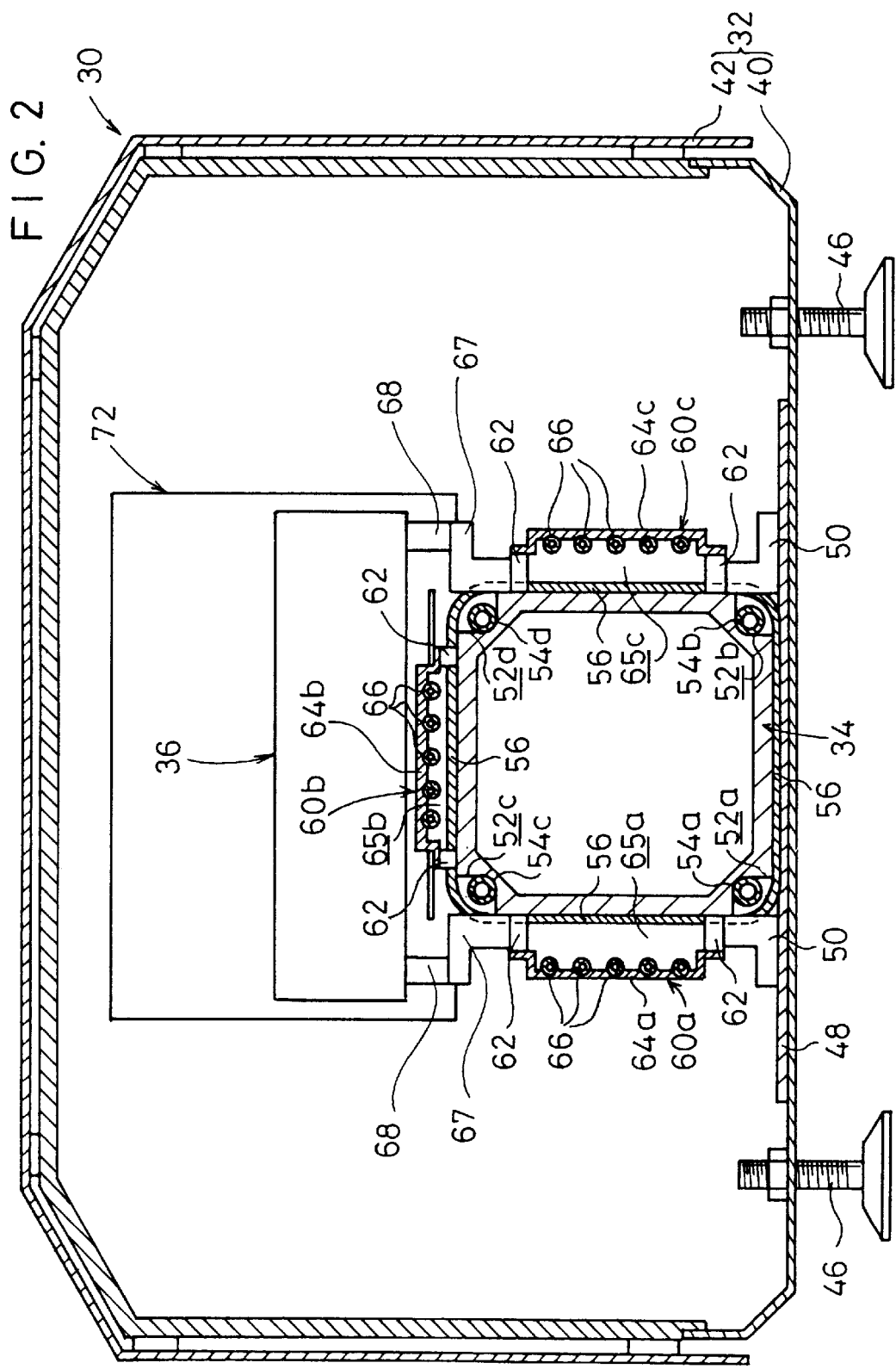
FIG. 2 is an enlarged transverse cross-sectional view of the laser oscillator system shown in FIG. 1.
Figure 3:
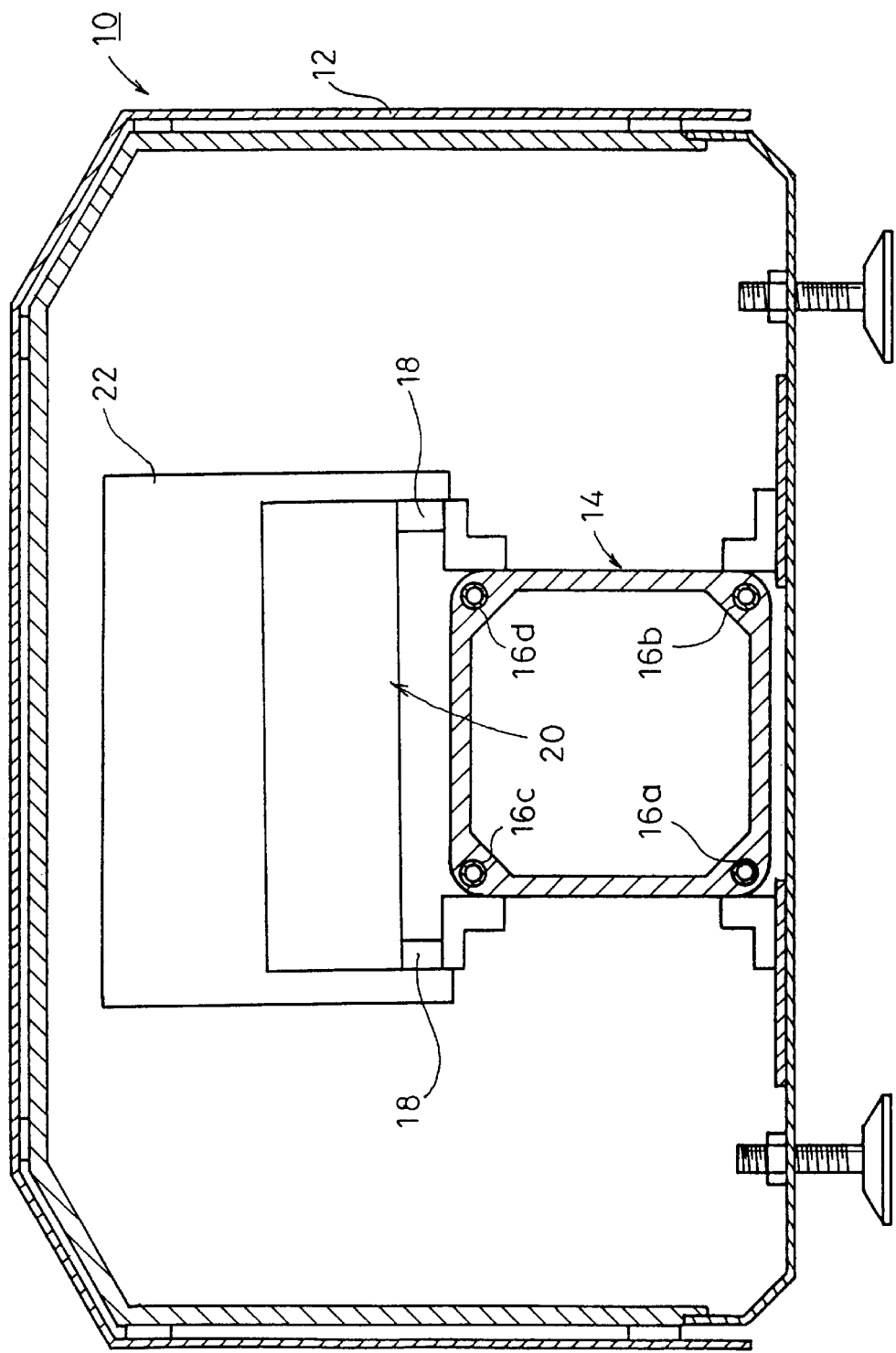
FIG. 3 is an enlarged transverse cross-sectional view of a conventional laser oscillator system.

As shown in FIGS. 1 and 2, a laser oscillator system 30 according to the present invention basically comprises an elongate casing 32, a frame 34 fixedly mounted on a bottom of the casing 32, and a laser oscillator 36 supported on the frame 34.

The casing 32 comprises a lower casing member 40 which is open upwardly and an upper casing 42 which closes the lower opening of the lower casing member 40 and surrounds the frame 34 and the laser oscillator 36. The lower casing member 40 is supported by a plurality of legs 46.

As shown in FIG. 2, a heat insulating plate 48 is fixedly mounted on a bottom of the lower casing member 40. The frame 34, which is of a hollow structure having a substantially square cross section, is mounted on an upper surface of the heat insulating plate 48 and extends in the longitudinal direction of the casing 32 which is normal to the sheet of FIG. 2. The frame 34 has a plurality of grooves 52a, 52b, 52c, 52d defined respectively in corners thereof and opening outwardly. The grooves 52a, 52b, 52c, 52d house therein respective cooling pipes 54a, 54b, 54c, 54d which pass a coolant therethrough. The frame 34 is covered with a heat insulating panel 56 securely attached to its outer circumferential surfaces. The frame 34 is firmly secured to the lower casing 40 by attachments 50.

Elongate cooling mechanisms 60a, 60b, 60c are disposed respectively on upper and side surfaces of the frame 34 and extend therealong. The cooling mechanisms 60a, 60b, 60c have respective plates 64a, 64b, 64c made of a material of high heat conductivity, such as aluminum, and supported by studs 62 fixed to the frame 34 near the corners thereof. The plates 64a, 64b, 64c have respective longitudinal marginal edges each bent into a crank shape as viewed in transverse cross section. The plates 64a, 64b, 64c and respective regions of the heat insulating panel 56 which face the plates 64a, 64b, 64c jointly define chamber 65a, 65b, 65c, respectively. A plurality of sets of tubes 66 of copper or the like are fixedly mounted in the respective chambers 65a, 65b, 65c and supported on the respective inner surfaces of the plates 64a, 64b, 64c which face the heat insulating panel 56. A coolant is introduced in the tubes 66.

Substantially L-shaped attachments 67 are fixed to upper opposite sides of the frame 34, and support pillars 68 made of a material of low heat conductivity such as a synthetic resin are vertically disposed on upper surfaces of the attachments 67. The laser oscillator 36 is supported on the support pillars 68 in upwardly spaced relation to the upper surface of the frame 34, with the heat insulating panel 56 and the cooling mechanism 60b being disposed in a gap between the frame 34 and the laser oscillator 36.

As shown in FIG. 1, a first mirror box 72 is mounted on an end of the laser oscillator 36, and a second mirror box 74 is mounted on an opposite end of the laser oscillator 36. A laser beam L generated by the laser oscillator 36 is emitted out of the laser oscillator 36 from the second mirror box 74.

Operation of the laser oscillator system 30 will be described below.

When the laser oscillator 36 is energized, the laser oscillator 36 oscillates to generate and emit the laser beam L out of the laser oscillator 36 from the second mirror box 74. The emitted laser beam L is applied to a workpiece (not shown) to machine, e.g., weld or cut, the workpiece.

The temperature of the laser oscillator 36 rises while it is in operation. The heat generated by the laser oscillator 36 is partly radiated toward the frame 34. The radiated heat is partly absorbed by the cooling mechanism 60b. The remaining heat is transferred through the chamber 65b which dissipates part of the heat, to the heat insulating panel 56, which blocks most of the heat (see FIG. 2). Therefore, any temperature rise of the frame 34 due to the transferred heat is very small. The heat generated by the laser oscillator 36 is partly radiated outwardly and reflected by the casing 32 inwardly toward the frame 34. The reflected heat is partly absorbed by the cooling mechanisms 60a, 60c. The remaining heat is transferred through the chambers 65a, 65c which dissipate part of the heat, to the heat insulating panel 56, which blocks most of the heat. The heat generated by the laser oscillator 36 is also partly transferred through the support pillars 68 to the attachments 67. However, since the support pillars 68 are made of a material of low heat conductivity such as a synthetic resin, any heat that is transferred from the support pillars 68 via the attachments 67 to the frame 34 is very small in quantity.

As a consequence, any temperature rise of the frame 34 is minimized while the laser oscillator system 30 is in operation, and hence the frame 34 is securely protected against deformation due to heat. Accordingly, the laser beam L emitted from the laser oscillator 36 supported on the frame 34 is prevented from changing its path, and is applied to a desired position which remains unchanged.

Furthermore, since the frame 34 is cooled by the coolant flowing through the cooling pipes 54a, 54b, 54c, 54d, the frame 34 is further prevented from rising in temperature, making it more effective to prevent the laser beam L emitted from the laser oscillator 36 supported on the frame 34 from changing its path.

Inasmuch as the laser oscillator system 30 keeps the laser beam L applied to a desired unchanged position, the laser oscillator system 30 is capable of machining workpieces highly accurately.

Although a certain preferred embodiment of the present invention has been shown and described in detail, it should be understood that various changes and modifications may be made therein without departing from the scope of the appended claims.

What is claimed is:

1. A laser oscillator system comprising:
   an elongate laser oscillator;
   a frame supporting said laser oscillator thereon;
   a plurality of cooling mechanisms each comprising tubes spaced from said laser oscillator for passing a coolant medium therethrough, at least one of said cooling mechanisms being disposed in a gap defined between said laser oscillator and said frame; and
   a heat insulating member having a portion thereof disposed in said gap defined between said laser oscillator and said frame;
   whereby heat generated by said laser oscillator and radiated to said frame can be absorbed by said cooling mechanisms and blocked by said heat insulating member.

2. A laser oscillator system according to claim 1, further comprising support members made of a synthetic resin, said support members being disposed on said frame and supporting said laser oscillator.

3. A laser oscillator system according to claim 1, further comprising:
   a casing housing said laser oscillator and said frame therein;
   said heat insulating member and said cooling mechanisms being disposed around said frame;
   whereby heat generated by said laser oscillator and reflected by said casing can be absorbed by said cooling mechanisms and blocked by said heat insulating member.

4. A laser oscillator system according to claim 1, wherein said frame has a plurality of cooling tubes disposed therein for passing a coolant therethrough.

5. A laser oscillator system according to claim 1, wherein said cooling mechanisms comprise:
   respective plates made of a material of high heat conductivity; and
   respective sets of tubes fixedly mounted respectively on said plates for passing a coolant therethrough.

6. A laser oscillator system comprising:
   an elongate laser oscillator;
   a frame supporting said laser oscillator thereon;
   a plurality of cooling mechanisms, at least one of said cooling mechanisms being disposed in a gap defined between said laser oscillator and said frame; and
   a heat insulating member having a portion thereof disposed in said gap defined between said laser oscillator and said frame,
   wherein said portion of said heat insulating member is spaced from said at least one cooling mechanism, thereby defining a chamber between said at least one cooling mechanism and said heat insulating member,
   whereby heat generated by said laser oscillator and radiated to said frame can be absorbed by said cooling mechanisms and blocked by said heat insulating member.

7. A laser oscillator system according to claim 6, wherein said heat insulating member and said plurality of cooling mechanisms are disposed around said frame, said heat insulating member being spaced from each of said cooling mechanisms, thereby defining respective chambers around said frame between said cooling mechanisms and said heat insulating member.

\* \* \* \* \*